(12) United States Patent
Weaver et al.

(10) Patent No.: US 6,486,115 B1
(45) Date of Patent: Nov. 26, 2002

(54) MICROEMULSION CLEANING COMPOSITION

(75) Inventors: Carl E. Weaver, Conroe, TX (US); Lawrence N. Kremer, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 49 days.

(21) Appl. No.: 09/706,999

(22) Filed: Nov. 6, 2000

Related U.S. Application Data

(60) Provisional application No. 60/194,179, filed on Nov. 9, 1999.

(51) Int. Cl.$^7$ .............................. C11D 9/50; C11D 7/50
(52) U.S. Cl. ...................... 510/417; 510/365; 510/424; 510/506
(58) Field of Search .............................. 134/1.3, 19, 29; 252/79.3; 424/70.19; 510/365, 417, 407, 421, 424, 505, 506

(56) References Cited

U.S. PATENT DOCUMENTS

| | | | |
|---|---|---|---|
| 3,732,166 A | 5/1973 | Lissant | 166/304 |
| 4,421,680 A | 12/1983 | Shivar | 252/526 |
| 4,511,488 A | 4/1985 | Matta | 252/162 |
| 4,749,509 A | 6/1988 | Kacher | 252/139 |
| 4,943,392 A | 7/1990 | Hastedt et al. | 252/539 |
| 5,080,831 A | 1/1992 | VanEenam | 252/558 |
| 5,082,584 A | 1/1992 | Loth et al. | 252/122 |
| 5,112,516 A * | 5/1992 | Koetzle | |
| 5,213,624 A | 5/1993 | Williams | 134/40 |
| 5,271,773 A | 12/1993 | Hamilton et al. | 134/10 |
| 5,281,354 A | 1/1994 | Faber | 252/154 |
| 5,348,679 A | 9/1994 | Weinhold et al. | 252/105 |
| 5,401,326 A | 3/1995 | Mihelic et al. | 134/40 |
| 5,425,814 A | 6/1995 | Krajicek et al. | 134/22.1 |
| 5,462,690 A | 10/1995 | Rhinesmith | 252/126 |
| 5,523,025 A * | 6/1996 | Erilli | |
| 5,587,357 A | 12/1996 | Rhinesmith | 510/417 |
| 5,602,090 A | 2/1997 | Melikyan et al. | 510/372 |
| 5,660,641 A | 8/1997 | Howe | 134/26 |
| 5,674,827 A | 10/1997 | Kawashima et al. | 510/365 |
| 5,679,628 A | 10/1997 | Simpson et al. | 508/583 |
| 5,691,289 A | 11/1997 | Purcell et al. | 510/174 |
| 5,753,605 A | 5/1998 | Blatter et al. | 510/299 |
| 5,814,594 A | 9/1998 | Vlasblom | 510/365 |
| 5,863,881 A | 1/1999 | Vlasblom | 510/365 |
| 5,912,222 A * | 6/1999 | Thomas et al. | |

FOREIGN PATENT DOCUMENTS

| | | |
|---|---|---|
| WO | WO 95/32275 | 11/1995 |
| WO | WO 98/06818 | 2/1998 |

\* cited by examiner

*Primary Examiner*—Gregory Webb
(74) *Attorney, Agent, or Firm*—Madan, Mossman & Sriram, P.C.

(57) ABSTRACT

Disclosed is an oil-in-water microemulsion composition for cleaning grease and oil with an optional deodorizing property. The composition comprises a cyclic organic solvent, an ether of an oligomeric glycol, a monoether of a monomeric glycol, a derivative of an aromatic sulfonic acid, water and, optionally, a deodorizing additive.

9 Claims, No Drawings

MICROEMULSION CLEANING COMPOSITION

CROSS REFERENCE TO RELATED APPLICATION

This application claims priority from United States Provisional Patent Application Ser. No. 60/194,179 filed on Nov. 9, 1999.

BACKGROUND OF THE INVENTION

1. Field of the Invention

This invention relates to a composition useful for cleaning, and optionally deodorizing, both light and oily grease and heavy and tarry asphaltenic deposits. This invention particularly relates to an oil-in-water microemulsion composition useful for cleaning, and optionally deodorizing, both light and oily grease and heavy and tarry asphaltenic deposits.

2. Background of the Invention

Many industrial and commercial process cleaning compositions or formulations include chlorine and/or fluorine containing compounds. While such compositions are very effective in cleaning oil, grease, heavy tars and other deposits from the surface of various materials, these halogen-containing compounds are believed to have long lasting adverse impact on the environment. In addition, some of these compounds may also pose health and safety concerns to those handling them.

Certain organic solvents have also been used in industrial and commercial process cleaning compositions. Typically the solvents are ketones, esters or aromatics. They are generally effective, however quite a large quantity is required and inevitably vapors of these organic compounds may escape to cause environment, health and safety related problems. In addition, these solvents tend to have low flash points.

A commonly encountered situation in the petroleum or refining industry is the presence of odorous materials together with many heavy, tarry or asphaltenic deposits from the reservoir or in the processing equipment or in a storage/transporting facility. Typically the odors are caused by hydrogen sulfide and/or mercaptans. Most of the existing cleaning compositions are ineffective in deodorizing or otherwise mitigating this problem.

Accordingly, it would be desirable and advantageous to have a composition or formulation which is effective in cleaning all kinds of oils, grease, tars, asphaltenic deposits and mixtures thereof. It would also be desirable and advantageous to have a composition or formulation which, at the same time, has a relatively high flash point, is environmentally friendly, and has low organic contents. It is desirable to use naturally occurring and/or biodegradable materials in the composition. It is preferable to use a water-based composition. In addition, it is also desirable to have a composition that can deodorize as well as clean. It is even more desirable that use of such a deodorizing composition can result in minimal waste.

SUMMARY OF THE INVENTION

The object of the present invention is to provide an oil-in-water microemulsion composition for cleaning. The composition comprises a cyclic organic solvent; an ether of an oligomeric glycol; a monoether of a monomeric glycol; a derivative of an alkyl aromatic sulfonic acid; and water, wherein the amount of water is in the range of from about 20% to about 99.9%, by weight, of the composition.

It is another object of the present invention to produce a cleaning and deodorizing composition comprising a cyclic organic solvent; an ether of an oligomeric glycol; a monoether of a monomeric glycol; a derivative of an alkyl aromatic sulfonic acid; a deodorizing additive; and water.

It is a further object of the present invention to use the disclosed compositions to clean light and oily grease as well as heavy tarry asphaltenic deposits, with the option of removing or reducing odors caused primarily by sulfur containing compounds such as $H_2S$ or mercaptans.

DETAILED DESCRIPTIONS OF THE INVENTION

The present invention relates generally to a composition that is useful for cleaning, and optionally, deodorizing light oily grease or heavy tarry asphaltenic deposits. It is preferred to have the composition in an oil-in-water microemulsion state to allow more effective use of the organic components in the composition.

The composition comprises a cyclic organic solvent, an ether of an oligomeric glycol, a monoether of a monomeric glycol, a derivative of an alkyl aromatic sulfonic acid and water. When a deodorizing property is desired in the composition, a deodorizing additive in an effective amount may be added to the composition to impart such a property.

The deodorizing additive may be used in a "one-pack" formulation or the deodorizing additive can be kept separate as a second "pack" until a proper time before use, i.e. forming a "two-pack" system. It is also contemplated that the deodorizing additive may be applied simultaneously with the rest of the composition to the surface to be cleaned. A "two-pack" may be preferred for certain situations. One such situation is that deodorizing is not needed at all times. A two-pack system would use the deodorizing additive only when needed. This can reduce both wastes and costs. Another situation is where there is a long-term compatibility problem between the deodorizing additive and the rest of the ingredients of the composition. A two-pack system can minimize the problem and increase the shelf-life of the final product.

The compositions of the present invention may be used to clean and/or to deodorize grease or asphaltenic deposits, on surfaces of a variety of materials such as metal, fabric, plastic (polymers), concrete, and others. It is common to use the compositions to clean storage tanks, pipelines, reactors, equipment, and the like, at ambient conditions or under other suitable conditions.

Many organic solvents can be used as part of different formulations for cleaning purposes. For this invention, cyclic organic solvents are preferred and used. Suitable cyclic organic solvents include, but are not limited to, various saturated and unsaturated monocyclic and bicyclic hydrocarbons such as monocyclic terpenes and bicyclic terpenes, oxygenated derivatives (alcohol/acid/epoxide/ester) of these hydrocarbons and mixtures thereof. Examples of these cyclic organic hydrocarbons include, but are not limited to, d-limonene, /-limonene, dipentene [138-86-3], various α and β-pinene isomers and their mixtures (such as [2437-95-8 ]; [7785-26-4]; [7785-70-8]; [19902-08-0] and [18172-67-3]), various α and γ-terpinene isomers (such as [99-86-5] and [99-85-4]), various camphenes [5794-03-6] and [5794-04-7], carenes [554-61 -0] and [13466-78-9] and mixtures thereof.

Certain derivatives of these materials are also within the embodiment of the present invention. Examples include terpinen-4-ol [562-74-3], α-terpineol [10482-56-1] and their mixtures. It is further noted that acyclic terpenes and their mixtures may also be used. Examples are myrcene [123-35-3] and 2,6-dimethyl-2,4,6-octatriene. All of the numbers in brackets represent the CAS (Chemical Abstracts Services) numbers for identification purposes. These compounds, their mixtures and many of their derivatives may be obtained from companies like Aldrich Chemical Company and other chemical suppliers.

These organic solvents may be manufactured or they may exist as natural products or mixtures. Some of the solvents are biodegradable. It is preferred to use biodegradable organic solvents to avoid accumulation in or adverse impact on the environment. Biodegradable organic solvents tend to cause fewer post-use contamination problems, thus they are more environmentally friendly. It is more preferred to use a solvent, which consists essentially of d-limonene.

A suitable ether of an oligomeric glycol has one of the following structures, with one or both of the OH groups in an ether form:

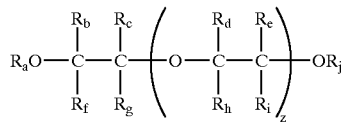

wherein $R_a$, $R_b$, $R_c$, $R_d$, $R_e$, $R_f$, $R_g$, $R_h$, $R_i$, and $R_j$, are independently selected from H or a $C_1$ to $C_6$ linear or branched alkyl groups, but $R_a$ and $R_j$ cannot both be H in the same molecule. If one of $R_a$ and $R_j$ is H in the molecule, it is a monoalkyl ether of the oligomeric glycol. If both of $R_a$ and $R_j$ are H in the same molecule, it is a dialkyl ether of the oligomeric glycol. Collectively, they are designated as the ethers of the oligomeric glycols. The symbol z is a number in the range of 1 to about 50.

A different way of describing the structures is that they are mono ethers (either $R_a$ or $R_j$ is H) or di ethers (neither of $R_a$ and $R_j$ is H) of an oligomeric glycol. The oligomeric glycol has a total of from two (z=1) to about fifty or fifty one (z=49 or 50) monomeric units and the monomeric units are selected from the group consisting of $C_2$ to $C_{10}$ carbon, preferably $C_2$ to $C_8$ carbon, backbone and mixtures thereof, wherein the backbone is linear or branched. The monomeric units refer to either that which is within the parenthesis or the one outside the parenthesis of the structure. It is also possible to use cyclic backbone monomeric unit such as 1,2-cyclopentanediol.

Ethers of dimeric glycols are preferred for preparing the compositions of the present invention. Ethers of di(propylene glycol), i.e. one of $R_b$, $R_c$, $R_f$ and $R_g$ is methyl and one of $R_d$, $R_e$, $R_h$ and $R_i$ is methyl, such as mono-methyl di(propylene glycol) are particularly preferred.

Examples of preferred ethers are selected from the group consisting of di(propylene glycol) mono-$C_1$ to $C_6$ alkyl ethers, di(propylene glycol) di-$C_1$ to $C_6$ alkyl ethers, di(ethylene glycol) mono-$C_1$ to $C_6$ alkyl ethers, di(ethylene glycol) di-$C_1$ to $C_6$ alkyl ethers and mixtures thereof.

A suitable monoether of a monomeric glycol has one of the following structures:

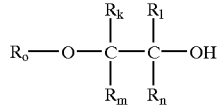

wherein $R_k$, $R_l$, $R_m$, $R_n$, and $R_o$ are independently selected from H or a $C_1$ to $C_8$ linear or branched alkyl groups.

A different way of describing the glycol part of the structure is that the monomeric glycol is selected from the group consisting of $C_2$ to $C_{10}$ carbon, preferably $C_2$ to $C_8$ carbon, backbone and mixtures thereof, wherein the backbone is linear or branched.

Monoethers of propylene glycol, ethylene glycol and butylene glycol mono-$C_1$ to $C_6$ alkyl ethers are preferred for preparing the compositions of the present invention. Monoethers of propylene glycol such as t-butoxy-2-propanol are particularly preferred.

A number of derivatives or derivative mixtures of alkyl aromatic sulfonic acids are suitable for use in the present invention. One-, two- or three-ring alkyl aromatic sulfonic acids are within the embodiment. A representative (one-ring) monoalkylbenzene sulfonic acid is shown below:

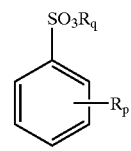

wherein $R_p$ is selected from the group consisting of $C_1$ to $C_{30}$ linear or branched alkyl groups, and $C_5$ to $C_{20}$ linear alkyl groups are preferred. $C_{12}$ alkyl (dodecyl) groups are particularly preferred. Because linear alkylbenzene sulfonic acids possess higher biodegradability, they are more favored in most cases in order to reduce environmental impact. A n-dodecylbenzene sulfonic acid (and its derivatives such as salts) is a most preferred alkyl aromatic sulfonic acid. $R_p$ may be in an ortho, meta or para position relative to the $SO_3R_q$ group. Para position for $R_p$ in a benzene ring is preferred. It is also possible to have additional substituent groups, particularly alkyl groups at all possible positions on the benzene ring, di-benzene rings, or other fused or linked aromatic rings.

In the preceding structure, $R_q$ is selected from the group consisting of H, Li, Na, K, Rb, Cs, $NH_4^+$, $N(R_rR_sR_tR_u)^+$ (organoammonium salts), $P(R_vR_wR_xR_y)^+$, (organophosphonium salts) and mixtures thereof. $R_r$, $R_s$, $R_t$, $R_u$, $R_v$, $R_w$, $R_x$ and $R_y$ are independently selected from H and $C_1$ to $C_8$ alkyl groups, but not all of them are H in the same molecule. The nitrogen derivatives, $NH_4^+$, organoammonium salts $N(R_rR_sR_tR_u)^+$ and mixtures thereof are preferred.

Water is present in the composition in an amount of at least about 20% by weight of the total weight of the composition. In general, the amount of water is preferably in the range of from about 20% to about 99.9%, by weight, of the total composition. A particularly preferred range is from about 23% to about 90%, by weight, of the composition. Commercially, it is preferred to sell and ship a more concentrated product. The user, however, would prefer to use as dilute a composition as possible. Accordingly, it is also within the embodiment of the present invention to further dilute a particular composition with more water prior to application. In other words, it is possible to have a much higher water content in the final formulation used. For the purposes of the present invention, the water content can be as high as 99.999% in the actual diluted final formulation.

The amount of the cyclic organic solvent is in the range of from about 0.5% to about 75%, preferably from about 1% to about 60%, all by weight of the composition. The amount of the ether of the oligomeric glycol is in the range of from about 0.5% to about 30%, preferably from about 1% to about 25%, all by weight, of the composition. The amount of the monoether of the monomeric glycol is in the range of from about 0.2% to about 30%, preferably from about 0.5% to about 8%, all by weight of the composition. The amount of the derivative of the alkyl aromatic sulfonic acid is in the range of from about 0.5% to about 45%, preferably from about 1.5% to about 35%, all by weight, of the composition.

A particularly preferred oil-in-water microemulsion composition has the following concentrations: from about 0.5% to about 75% of d-limonene; from about 0.5% to about 30% of di(propylene glycol) methyl ether; from about 0.2% to about 30% of 1-t-butoxy-2-propanol; and from about 0.5% to about 45% of a derivative, such as acid, ammonium, organoammonium or mixtures thereof of n-dodecylbenzene sulfonic acid, all by weight, of the oil-in-water microemulsion composition.

In another embodiment of the present invention, the composition also contains an additive, present in an amount in the range of from about 0% to about 60%, preferably from about 0.01% to about 50%, all by weight, of the composition. This amount is generally effective in removing or reducing odors, particularly odors caused by $H_2S$ and, optionally, odors by mercaptans, sulfides, disulfides, and mixtures thereof.

There are many mechanisms leading to odor removal and/or reduction. Without being limited to any particular theory or hypothesis, some of these mechanisms involve reacting away or absorbing or adsorbing the odor-causing species. For instance, $H_2S$ concentration may be reduced by using a strong base such as caustic. Mercaptans may react with amines, amine hydroxides, amine oxides, amine-aldehyde adducts, and mixtures thereof to form different products, which are less odorous and/or have much lower vapor pressures.

There are many different additives that may be used for the disclosed composition for deodorizing purposes. Generally, these additives should react readily with hydrogen sulfide, optionally with mercaptans, sulfides or disulfides chemically, or they should have acceptable capacity to absorb/adsorb the odor-causing sulfur compounds. The additives may be either soluble (or miscible) or insoluble in any of the components of the composition. It is important that the deodorizing additives are compatible, as much as possible, with the other components of the composition, chemically or physically. For preferred oil-in-water microemulsions, the deodorizing additive is preferred not to cause the emulsion to separate into phases.

A preferred type of deodorizing additives consists essentially of amines, amine mixtures, amine hydroxides, amine-aldehyde adducts, and mixtures thereof. Examples include, but are not limited to, n-octylamine, choline hydroxide, tetrabutylammonium hydroxide, and mixtures thereof. Some of these additives, in various formulations and concentrations, can be obtained from various companies. For instance, SULFIX 200*, SULFIX 400*, SULFIX 600*, SULFIX 800*, SULFIX 9220*, SULFIX 9260* and SULFIX 9281* cleaning compositions can be obtained commercially from Baker Petrolite Inc. (*SULFIX 200, SULFIX 400, SULFIX 600, SULFIX 800, SULFIX 9220, SULFIX 9260 and SULFIX 9281 are trade designations of Baker Petrolite, Inc.).

Caustic materials such as NaOH, KOH, LiOH, RbOH, CsOH and mixtures thereof may also be used alone or with other additives in preparing the compositions of the present invention, provided that they are chemically and physically compatible with other components present in the composition.

Another type of additive includes an amine oxide or amine oxide mixtures. Examples of a suitable amine oxide includes, but is not limited to, lauryl dimethylamine oxide, myristyl dimethylamine oxide, stearyl dimethylamine oxide, 2,6-di-t-butylpyridine oxide and mixtures thereof.

A particularly preferred composition with an additive has the following concentrations: from about 0.5% to about 75% of d-limonene; from about 0.5% to about 30% of di(propylene glycol) methyl ether; from about 0.2% to about 30% of 1-t-butoxy-2-propanol; from about 0.5% to about 45% of a derivative of dodecylbenzene sulfonic acid, particularly the ammonium salt ($NH_4^+$) of n-dodecylbenzene sulfonic acid; from about 0.01% to about 50% of a deodorizing additive; and from about 20% to about 99.9% water, all by weight, of the composition, wherein the additive is blended together or kept separated until right before or a short time prior to use.

As described earlier, it is also envisioned that the deodorizing additive, when used, can be either mixed with all the other components of the composition, or alternatively, kept separate from the others until a convenient time prior to the composition is used. The latter "two-pack" system may be preferred in cases such as treating sporadic, not constant, odor problems or when there is a long-term compatibility problem between the deodorizing additive and one or more of the other components of the composition. If the deodorizing additive is kept separate from the rest of the composition, some kind of mixing or blending device, mechanism or means may be required after the additive is added to the rest of the composition. If the composition is in an oil-in-water microemulsion state, it is important that the mixing or blending will not substantially destroy such a state in order to achieve sufficient cleaning.

In addition to the chemical composition, the physical state of the composition is also very important. A microemulsion, particularly an oil-in-water microemulsion, is preferred for all of the compositions of the present invention.

An emulsion comprises two immiscible phases—an oil phase and a water phase. In an oil-in-water emulsion, water forms the continuous phase. There are many reasons for this preference for an oil-in-water microemulsion. For example, an oil-in-water microemulsion can reduce the amount of organic materials such as the cyclic organic solvent used in the composition. This is beneficial to the environment and at the same time reduces raw material cost. It is also believed that a microemulsion will work faster for cleaning or deodorizing due to the increased surface area of the microemulsion micelles. Higher surface areas can allow better and/or more effective contact between the components of the composition and the grease or asphaltenic deposit or $H_2S$ or the mercaptan present. It is preferred that the composition has a flash point higher than about 120° F. (49° C.).

Microemulsions are preferred. In particular, oil-in-water microemulsions, i.e. water is the continuous phase with oil droplets as the noncontinuous phase, are particularly preferred. The term "microemulsion" used herein means that the oil droplets in the continuous water phase are relatively small. Because of the small size of the oil droplets, it is commonly observed that microemulsions tend to remain more stable, i.e. without phase separation, for longer periods of time than emulsions with larger oil droplets. Another property of microemulsions is that they tend to appear more transparent or translucent than regular emulsions, resulting from less light scattering by the smaller oil droplets.

The microemulsions may be prepared by a number of methods known to those skilled in the art. For example, the microemulsions of the present invention can be formed quite readily from the components with the aid of a stirrer or blending equipment. Other commercially available emulsifying equipment providing mechanical agitation may be used as well to prepare the microemulsions.

The following examples are provided to illustrate certain embodiments of the present invention. The examples are not intended to limit the scope of the present invention and they should not be so interpreted.

EXAMPLE 1

An oil-in-water microemulsion is prepared with the following composition:

TABLE I

| Component | wt % |
|---|---|
| BPR 45410[a] | 37.5 |
| dipropylene glycol methyl ether | 8.4 |
| 1-t-butoxy-2-propanol | 2.8 |
| Pomoco H101[b] | 20.0 |
| Water | 31.3 |

[a]consisting essentially of d-limonene, available from Baker Petrolite, a cyclic organic solvent.
[b]consisting essentially of the ammonium salt of n-dodecylbenzene sulfonic acid, obtained from Piedmont Chemical Company.

This composition has a flash point of about 120° F. (49° F.), a pH lower than about 6 measured neat or in water/isopropanol, and a Reid Vapor pressure of 0.25 psi.

EXAMPLE 2

An oil-in-water microemulsion is prepared with the following composition:

TABLE II

| Component | wt % |
|---|---|
| dipentene[a] | 21.60 |
| dipropylene glycol methyl ether | 7.60 |
| 1-t-butoxy-2-propanol | 3.80 |
| Triton GR7M[b] | 11.40 |
| Triton SP160[b] | 7.60 |
| Triton SP190[b] | 7.60 |
| Mackam BC39[c] | 9.50 |
| propylene glycol | 6.60 |
| Surfadone LP-100[d] | 0.60 |
| Water | 23.80 |

[a]available from Millennium Specialty Chemical Co. (cyclic organic solvent)
[b]available from Union Carbide.
[c]available from McIntyre Group.
[d]available from ISP Investment.

TRITON is a registered trademark of Union Carbide Chemicals and Plastics Technology Corporation; SURFADONE is a registered trademark of ISP Investment Inc.

EXAMPLE 3

The following test results are obtained at ambient temperature (about 25° C.) by determining the amount of deposit removed from a coupon after exposure to the cleaning composition for 150 minutes (2.5 hours) with stirring by using a Bird paddle stirrer set at 70 RPM stirring speed.

TABLE III

| Cleaning Composition from | wt % of deposit removal |
|---|---|
| Example 1 | 99.9 |
| Example 2 | 99.4 |
| BPR44995[a] | 78.0 |
| Water[b] | 49.4 |

TABLE III-continued

| Cleaning Composition from | wt % of deposit removal |
|---|---|

[a]a conventional microemulsion cleaner available from Baker Petrolite, comparison experiment
[b]blank experiment with water only.

EXAMPLE 4

The following test results are obtained at ambient temperature (about 25° C.) by determining the amount of deposit removed from a coupon after exposure to the cleaning composition for 300 minutes (5 hours) with stirring by using a Bird paddle stirrer set at 90 RPM stirring speed. Duplicate experiments are carried out.

TABLE IV

| Cleaning Composition from | wt % of deposit removal |
|---|---|
| Example 1 | 3.7 |
| Example 1 | 2.3 |
| BPR44990[a] | 0.0 |
| BPR44990[a] | (−0.5) |
| Control | (−0.1) |
| Control | (−1.0) |

[a]a conventional microemulsion cleaner available from Baker Petrolite, comparison experiment.

EXAMPLE 5

The following test results are obtained at a temperature of 133° F. (about 56° C., initial temperature) to 150° F.(about 66° C. final temperature) by determining the amount of deposit removed from a coupon after exposure to the cleaning composition for 210 minutes (3.5 hours) with stirring by using a Bird paddle stirrer set at 90 RPM stirring speed. Duplicate experiments are carried out.

TABLE V

| Cleaning Composition from | wt % of deposit removal |
|---|---|
| Example 1 | 28.9 |
| Example 1 | 41.1 |
| BPR44990[a] | 11.1. |
| BPR44990[a] | 8.9 |
| Control | 4.0 |
| Control | 3.3 |

[a]A conventional microemulsion cleaner available from Baker Petrolite.

EXAMPLE 6

The oil-in-water microemulsion prepared in accordance with Example 1 is mixed with a number of deodorizing additives to determine if and how much hydrogen sulfide could be removed by using the composition. The results are tabulated below:

TABLE VI

| Composition | Concentration (vppm) | Initial $H_2S$ (ppm) | Final $H_2S$ (ppm) | Reduction % |
|---|---|---|---|---|
| untreated | 0 | 24.3 | 24.3 | — |
| Sulfix 400 | 100 | 17.7 | 11.1 | 37 |
| Sulfix 600 | 100 | 17.4 | 10.5 | 40 |
| Sulfix 800 | 100 | 15.0 | 5.7 | 62 |
| Sulfix 9220 | 100 | 19.3 | 14.3 | 26 |

TABLE VI-continued

| Composition | Concentration (vppm) | Initial H₂S (ppm) | Final H₂S (ppm) | Reduction % |
|---|---|---|---|---|
| Sulfix 9260 | 100 | 20.0 | 15.7 | 22 |
| Sulfix 9281 | 100 | 18.6 | 12.9 | 31 |

TABLE VII

| Composition | Concentration (vppm) | Initial H₂S (ppm) | Final H₂S (ppm) | Reduction % |
|---|---|---|---|---|
| untreated | 0 | 21.6 | 21.8 | — |
| Example 1 (I) | 5000 | 25.7 | 23 | 11 |
| (I) + 2% Sulfix 400 | 5000 | 24.3 | 22.6 | 7 |
| (I) + 2% Sulfix 600 | 5000 | 21.9 | 15.6 | 29 |
| (I) + 2% Sulfix 800 | 5000 | 26.2 | 13.3 | 49 |
| (I) + 2% Sulfix 9220 | 5000 | 26.6 | 16.8 | 37 |
| (I) + 2% Sulfix 9260 | 5000 | 25.9 | 14.5 | 44 |
| (I) + 2% Sulfix 9281 | 5000 | 21.6 | 16.7 | 23 |

A number of theories and hypotheses are discussed herein. They are used solely for easy understanding and better appreciation of the present invention by one skilled in the art. They are not intended to limit either the scope or the spirit the invention in any way. Similarly, the foregoing examples and any preferred embodiments are intended only for illustration purposes to demonstrate the embodied invention. They are not intended to limit the spirit or the scope of the invention, which is described by the entire written disclosure herein and defined by the claims below.

What is claimed is:

1. A cleaning and deodorizing composition comprising:
   a cyclic organic solvent;
   an ether of an oligomeric glycol;
   a monoether of a monomeric glycol;
   a derivative of an alkyl aromatic sulfonic acid;
   an amine-aldehyde adduct deodorizing additive; and
   water.

2. The composition of claim 1, wherein the composition is in an oil-in-water microemulsion state and water is in the range of from about 20% to about 99.9%, by weight, of the composition.

3. The composition of claim 2, wherein the cyclic organic solvent is selected from the group consisting of monocyclic terpenes, bicyclic terpenes and mixtures thereof.

4. The composition of claim 1, wherein the oligomeric glycol has from two to about fifty monomeric units and the monomeric units are selected from the group consisting of $C_2$ to $C_{10}$ carbon backbone and mixtures thereof, wherein the backbone is linear or branched.

5. The composition of claim 1, wherein the monomeric glycol is selected from the group consisting of $C_2$ to $C_{10}$ linear alkyl glycols, $C_3$ to $C_{10}$ branched alkyl glycols and mixtures thereof.

6. The composition of claim 1, wherein the derivative is selected from the group consisting of acid, salt, $NH_4^+$, organoammonium salt and mixtures thereof; and the alkyl aromatic sulfonic acid consists essentially of at least one alkylbenzene sulfonic acid.

7. The composition of claim 1, wherein the ether is selected from the group consisting of di(propylene glycol) mono-$C_1$ to $C_6$ alkyl ethers, di(propylene glycol) di-$C_1$ to $C_6$ alkyl ethers, di(ethylene glycol) mono-$C_1$ to $C_6$ alkyl ethers, di(ethylene glycol) di-$C_1$ to $C_6$ alkyl ethers and mixtures thereof.

8. The composition of claim 1, wherein the monoether is selected from the group consisting of ethylene glycol mono-$C_1$ to $C_6$ alkyl ethers, propylene glycol mono-$C_1$ to $C_6$ alkyl ethers, butylene glycol mono-$C_1$ to $C_6$ alkyl ethers and mixtures thereof.

9. The composition of claim 1, wherein the cyclic organic solvent consists essentially of from about 0.5% to about 75% of d-limonene;

the ether consists essentially of from about 0.5% to about 30% of di(propylene glycol) methyl ether;

the monoether consists essentially of from about 0.2% to about 30% of 1-t-butoxy-2-propanol;

the derivative consists essentially of from about 0.5% to about 45% of ammonium salt of dodecylbenzene sulfonic acid;

the deodorizing additive is present at a concentration of from about 0.01% to about 50%; and the water is present at a concentration of from about 20% to about 99.9%, all by weight, of the composition.

* * * * *